United States Patent
Gattiker et al.

(10) Patent No.: US 9,430,559 B2
(45) Date of Patent: *Aug. 30, 2016

(54) DOCUMENT RETRIEVAL USING INTERNAL DICTIONARY-HIERARCHIES TO ADJUST PER-SUBJECT MATCH RESULTS

(71) Applicant: INTERNATIONAL BUSINESS MACHINES CORPORATION, Armonk, NY (US)

(72) Inventors: Anne Elizabeth Gattiker, Austin, TX (US); Fadi H. Gebara, Austin, TX (US); Anthony N. Hylick, Austin, TX (US); Rouwaida N. Kanj, Round Rock, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/854,767

(22) Filed: Sep. 15, 2015

(65) Prior Publication Data

US 2016/0004704 A1  Jan. 7, 2016

Related U.S. Application Data

(63) Continuation of application No. 14/077,305, filed on Nov. 12, 2013, now Pat. No. 9,235,638.

(51) Int. Cl.
*G06F 17/30* (2006.01)

(52) U.S. Cl.
CPC ..... *G06F 17/30672* (2013.01); *G06F 17/3053* (2013.01); *G06F 17/30327* (2013.01);
(Continued)

(58) Field of Classification Search
CPC ............. G06F 17/30616; G06F 17/3071
See application file for complete search history.

(56) References Cited

U.S. PATENT DOCUMENTS

| 6,038,561 A | 3/2000 | Snyder et al. |
| 6,098,066 A | 8/2000 | Snow et al. |

(Continued)

FOREIGN PATENT DOCUMENTS

| KR | 2010106718 A | 10/2010 |
| WO | WO 2007008263 | 1/2007 |
| WO | WO 2012040673 | 3/2012 |

OTHER PUBLICATIONS

Notice of Allowance in U.S. Appl. No. 14/077,305 mailed on Sep. 1, 2015, 11 pages (pp. 1-11 in pdf).

(Continued)

*Primary Examiner* — William Spieler
(74) *Attorney, Agent, or Firm* — Mitch Harris, Atty at Law, LLC; Andrew M. Harris; William J. Stock

(57) ABSTRACT

Techniques for managing big data include retrieval using per-subject dictionaries having multiple levels of sub-classification hierarchy within the subject. Entries may include subject-determining-power (SDP) scores that provide an indication of the descriptive power of the entry term with respect to the subject of the dictionary containing the term. The same term may have entries in multiple dictionaries with different SDP scores in each of the dictionaries. A retrieval request for one or more documents containing search terms descriptive of the one or more documents can be processed by identifying a set of candidate documents tagged with subjects, i.e., identifiers of per-subject dictionaries having entries corresponding to a search term, then using affinity values to adjust the aggregate score for the terms in the dictionaries. Documents are then selected for best match to the subject based on the adjusted scores. Alternatively, the adjustment may be performed after selecting the documents by re-ordering them according to adjusted scores.

18 Claims, 10 Drawing Sheets

(52) U.S. Cl.
CPC ... *G06F17/30345* (2013.01); *G06F 17/30528* (2013.01); *G06F 17/30598* (2013.01); *G06F 17/30663* (2013.01); *G06F 17/30666* (2013.01); *G06F 17/30707* (2013.01); *G06F 17/30734* (2013.01)

(56) References Cited

U.S. PATENT DOCUMENTS

| | | | |
|---|---|---|---|
| 6,473,730 | B1 | 10/2002 | McKeown et al. |
| 7,069,505 | B2 | 6/2006 | Tamano |
| 7,185,001 | B1 | 2/2007 | Burdick et al. |
| 7,676,462 | B2 | 3/2010 | Kirkland et al. |
| 8,019,748 | B1 | 9/2011 | Wu et al. |
| 8,180,783 | B1 | 5/2012 | Fletcher et al. |
| 2002/0022956 | A1 | 2/2002 | Ukrainczyk et al. |
| 2003/0158839 | A1 | 8/2003 | Faybishenko et al. |
| 2004/0024739 | A1 | 2/2004 | Copperman et al. |
| 2005/0289168 | A1 | 12/2005 | Green et al. |
| 2006/0101102 | A1 | 5/2006 | Su et al. |
| 2006/0235843 | A1 | 10/2006 | Musgrove et al. |
| 2008/0082486 | A1 | 4/2008 | Lermant et al. |
| 2009/0006391 | A1 | 1/2009 | Ram |
| 2009/0094020 | A1 | 4/2009 | Marvit et al. |
| 2009/0198669 | A1 | 8/2009 | Shaw et al. |
| 2009/0292686 | A1 | 11/2009 | Carter et al. |
| 2010/0131507 | A1 | 5/2010 | Pradhan et al. |
| 2010/0169375 | A1 | 7/2010 | Cumby et al. |
| 2010/0198816 | A1 | 8/2010 | Kwan |
| 2010/0293174 | A1 | 11/2010 | Bennett et al. |
| 2011/0125791 | A1 | 5/2011 | Konig et al. |
| 2011/0184932 | A1 | 7/2011 | Hennum et al. |
| 2011/0208776 | A1 | 8/2011 | Lee et al. |
| 2011/0320186 | A1 | 12/2011 | Butters et al. |
| 2011/0320437 | A1 | 12/2011 | Kim et al. |
| 2012/0078902 | A1 | 3/2012 | Duboue et al. |
| 2012/0158703 | A1 | 6/2012 | Li et al. |
| 2013/0173604 | A1 | 7/2013 | Li et al. |
| 2014/0337357 | A1 | 11/2014 | Gattiker et al. |
| 2015/0106376 | A1 | 4/2015 | Gattiker et al. |
| 2015/0134666 | A1 | 5/2015 | Gattiker et al. |

OTHER PUBLICATIONS

Castillo, et al., "Automatic Assignment of Domain Labels to WordNet", Proceedings of the $2^{nd}$ International WordNet Conference, Jan. 2004, pp. 75-82, Brno, Czech Republic.

Kamat, et al., "Understanding Users Intent by Deducing Domain Knowledge Hidden in Web Search Query Keywords", International Journal of Computer Applications, Apr. 2013, pp. 17-20, vol. 67, No. 15, IJCA Journal.

Godoy, et al., "Modeling User Interests by Conceptual Clustering," ISISTAN Research Insititute, UNICEN University Campus Universitario, Tandil (7000), Jan. 18, 2005, pp. 247-265, Buenos Aires, Argentina.

Software Patent Institute, "A Framework for Basic Research on Mechanized Information Storage, Search and Selection," IP.com No. IPCOM000128819D, Sep. 19, 2005,19 pages (pp. 1-19 in pdf).

IBM, "System and Method to Refine Search Terms for Repetitive Search Queries Based on Explicit User Feedback," IP.com No. IPCOM000160889D, Dec. 3, 2007, 3 pages (pp. 1-3 in pdf).

Anonymous, "Parse Search Terms in Content Discovery," IP.com No. IPCOM000203097D, Jan. 19, 2011,4 pages (pp. 1-4 in pdf).

IBM, "Enhancing the Classification, Organization, and Mining of Unstructured Data Using Second and Higher Order Meta-Tags," IP.com No. IPCOM000143547D, Nov. 28, 2006, 4 pages (pp. 1-4 in pdf).

Anonymous, "Complex Data Tags," IP.com No. IPCOM000214383D, Jan. 24, 2012, 5 pages (pp. 1-5 in pdf).

Gurumurthy, et al., "Method and System for Sharing Search Queries and Search Results," IP.com No. IPCOM000210142D, Aug. 26, 2011, 3 pages (pp. 1-3 in pdf).

Manning, et al., "An Introduction to Information Retrieval," Apr. 2009, pp. 349-375 (pp. 1-27 in pdf), Cambridge University Press, downloaded from: http://nlp.stanford.edu/IR-book/html/htmledition/flat-clustering-1.html on Sep. 3, 2013.

Manning, et al., "An Introduction to Information Retrieval," Apr. 2009, pp. 253-287 (pp. 1-35 in pdf), Cambridge University Press, downloaded from: http://nlp.stanford.edu/IR-book/html/htmledition/text-classification-and-naive-bayes-1.html on Sep. 3, 2013.

| 24A | FARM SUPPLIES | |
|---|---|---|
| FEED | | 6 |
| FERTILIZER | | 9 |
| IRRIGATION | | 7 |
| PENS | | 2 |

| 28A DOCUMENT TITLE/ SUMMARY |
|---|
| LINK TO DOCUMENT |
| Subject 1, term 1, term 2, … |
| Subject 2, term 1, term 2, … |

| 24B | OFFICE SUPPLIES | |
|---|---|---|
| PENS | | 8 |
| STAPLES | | 6 |
| PAPER | | 5 |
| FOLDERS | | 7 |

| 28B DOCUMENT TITLE/ SUMMARY |
|---|
| LINK TO DOCUMENT |
| Subject1 |
| Subject 2 |
| … |

Fig. 3

01# DOCUMENT RETRIEVAL USING INTERNAL DICTIONARY-HIERARCHIES TO ADJUST PER-SUBJECT MATCH RESULTS

The present Application is a Continuation of U.S. patent application Ser. No. 14/077,305, filed Nov. 12, 2013 and published as U.S. Patent Publication No. 20150134666 on May 14, 2015, and claims priority thereto under 35 U.S.C. §120. U.S. patent application Ser. No. 14/077,305 is related to co-pending U.S. patent application Ser. No. 13/891,610 entitled "DOCUMENT TAGGING AND RETRIEVAL USING PER-SUBJECT DICTIONARIES INCLUDING SUBJECT-DETERMINING-POWER SCORES FOR ENTRIES" as filed on May 10, 2013 and published as U.S. Patent Publication No. 20140337357 on Nov. 13, 2014, and U.S. patent application Ser. No. 14/055,379, entitled "DOCUMENT TAGGING AND RETRIEVAL USING ENTITY SPECIFIERS", as filed on Oct. 16, 2013 and published as U.S. Patent Publication No. 20150106376 on Apr. 16, 2015, both having at least one common inventor with the present U.S. Patent Application. The Disclosures of the above-referenced U.S. Patent Applications are incorporated herein by reference.

BACKGROUND OF THE INVENTION

1. Field of the Invention

The present invention is related to document retrieval and categorization, as well as information searches, and more specifically to a computer-performed method, computer system and computer program product for document retrieval using per-subject dictionaries, and in which an internal hierarchy of the dictionaries is used to adjust per-subject match results.

2. Description of Related Art

Information storage and retrieval in computer systems is an ever-evolving technology as collections of data become progressively larger and more complex. So-called "big data" involves collection of large amounts of data that may be essentially unfiltered and uncategorized. While businesses, government and other entities would like to capitalize on information that can be gleaned from such large collections of data, techniques to efficiently retrieve a manageable amount of information in response to a query are needed.

Retrieval of information from present-day databases and other more loosely-coupled information sources such as the Internet is typically performed by either crawler-based indexing, in which software engines obtain indexing information from stored documents, or from human-built directories that categorize the stored documents. However, once the data source becomes sufficiently large, the size of the response to a query also grows.

Therefore, it would be desirable to provide a method, computer system and computer program that can more efficiently handle categorization of documents and retrieval of documents in response to queries.

BRIEF SUMMARY OF THE INVENTION

The invention is embodied in a computer-performed method, computer program product and computer system that can efficiently categorize and retrieve documents. The method is a method of operation of the computer system, which executes the computer program product to carry out the steps of the method.

The method stores entries in multiple dictionaries that are each associated with a different subject. The entries contain descriptive terms, wherein at least some of the descriptive terms are present in more than one of the per-subject dictionaries. A collection of documents is associated with the dictionaries by tagging the collection of documents with one or more associated subjects corresponding to the per-subject dictionaries. Queries for documents are performed by matching the search terms to the dictionaries and then retrieving the documents associated with dictionaries found by the matching. The hierarchy information is used to adjust a result of the matching and/or the retrieving to reflect heightened importance of search terms that are more closely associated in a hierarchy.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

FIG. 3 is a pictorial diagram showing organization of dictionaries as may be used in the document tagging and retrieval system of FIG. 2.

DETAILED DESCRIPTION OF THE INVENTION

Figure 1:
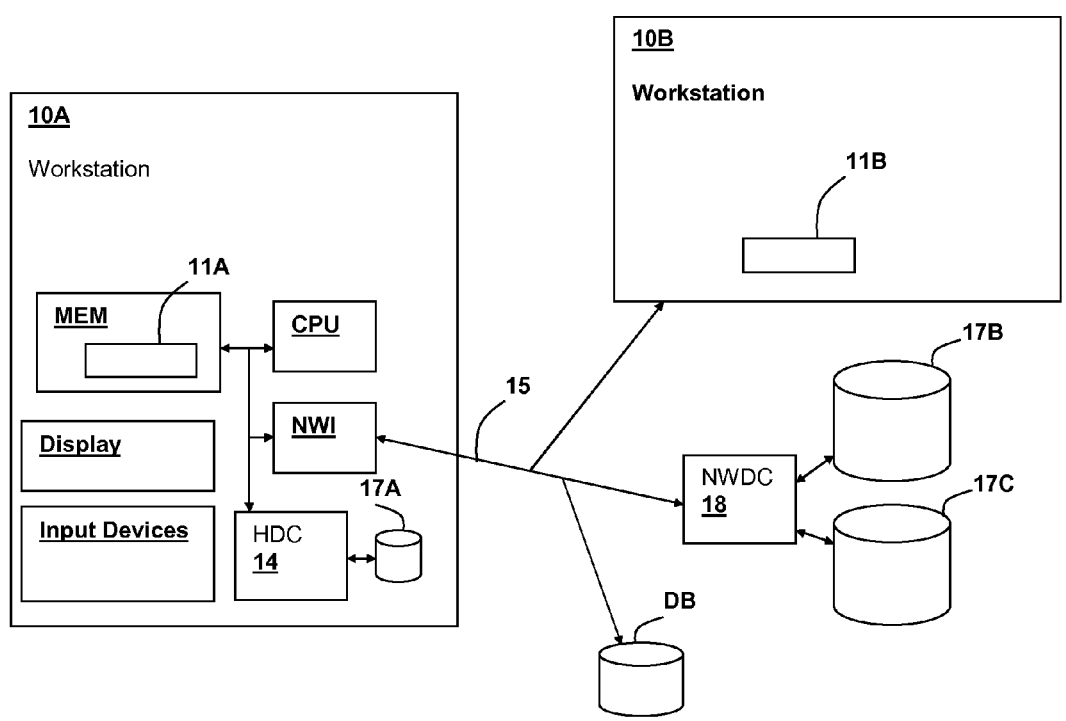
FIG. 1 is a block diagram illustrating a networked computer system in which techniques according to an embodiment of the present invention are practiced.

The present invention relates to document retrieval, and in particular to techniques for identifying and retrieving files in big data collections. Multiple dictionaries, each having a corresponding subject, contain entries corresponding to descriptive terms that are associated with the subject, i.e., the terms that ordinarily occur in association with the subject in written documents. Thus, a term may occur across multiple entries in multiple dictionaries, but have a different meaning or descriptive power with respect to different subjects. The entries are also organized in a hierarchy of sub-classification that is used during document retrieval to weight multiple matching terms in a dictionary according to whether they have strong affinity (e.g., terms that are in the same sub-classification) or a weak affinity (e.g., terms that have no descriptive relationship at all other than being in the same subject dictionary). The entries in each dictionary also have a score value associated with their corresponding term and stored in the dictionary along with the term. The score value is a "subject-determining-power score" (SDP score) that is an indicator of the power of the term to determine the subject of a query, a document, or other item associated with the term. For example, an SDP score may be used to weight terms used to tag a document, according to how strongly they indicate that the document concerns a particular subject. A tag is stored information that is descriptive in some manner of an associated document. The tag can be stored in the document itself, e.g., as metadata in a header, or the tag may be stored separately from the document, e.g., in a database containing a link to the document. The process of tagging is generating or selecting the tag information and storing it in a manner that associates the tag(s) with the document. Tagging can occur when a document is first added to a collection, which may be storage of the document in a particular storage location, or may be insertion of a link to the document in a database, or tagging may occur subsequently.

Documents are retrieved by identifying documents from a collection and returning the documents to a requesting entity. The particular documents returned and the particular order of the documents can be determined by the quality of a match of the documents to one or more subjects determined from the contents of a query. The query is first matched to the dictionaries to determine the subject(s) of the query. The hierarchy information is used to adjust the results of a match between search terms and the multiple subjects, by adjusting the documents returned for each matching dictionary according to affinity between pairs of search terms for each subject as indicated by the hierarchy within the dictionary associated with that subject. The affinities between search terms can also be used to adjust the match scores used to select the order of the matching dictionaries. The hierarchical information describing the organization of the entries in a dictionary is used to determine the affinity between pairs of terms that match entries in the dictionary, and the SDP scores for those terms is adjusted based on the affinity of the pair, which strengthens the contribution to the quality of the match more for pairs of terms having higher affinities than for pairs of terms having lower affinities.

The response to a query can differ. One possible response includes copying the documents to a predetermined location, such as a directory that has been specified or created to receive the results of the query. Another possible response is generation of a file that contains a list of document identifiers, e.g., file pathnames or links, in order of priority, and optionally including a match-score associated with each document. A third option is generation of an html document, e.g., html browser page that provides links to the documents in the order of priority, e.g. ordered by quality of the match of the individual documents to the query.

As mentioned above, dictionaries, as referred to herein, are subject-specific lists of terms along with differentiating SDP scores for the terms. A term can be a single word or multiple words, and can potentially include letters, numbers, punctuation, etc. The same term may appear in the dictionaries for different subjects with different SDP scores. In essence, an SDP score for a particular term for a particular subject indicates how strongly the appearance of the term suggests the term concerns the particular subject. Terms can be single words or multi-words, e.g., War of 1812. When processing queries or documents to discover terms, standard text pre-processing can be performed before any of the analytical steps, such as phrase detection using punctuation or detection of separators such as the, and, more, etc., which can be removed from the text. Similarly, stemming can be performed to reduce or expand words of a single root to a single term, e.g., the word "acted" may be stemmed to the word "act."

Referring to FIG. 1, a networked computer system in which an embodiment of the present invention is practiced is depicted in a block diagram. A first workstation computer system 10A includes a processor CPU coupled to a memory MEM that contains program instructions for execution by processor CPU, including a document collection interface 11A, which may be a dedicated engine for performing tasks in a collection of documents as described herein, or which may be a generic browser interacting with a dedicated engine located in another system, such as document collection interface 11B of workstation 10B. The tasks performed by one or both of document collection interfaces 11A and 11B include query processing, document tagging, directory creation and other tasks associated with managing the collection of documents and dictionaries used by and operated on by the embodiments of the invention disclosed herein. Workstation computer 10A is also depicted as including a graphical display Display and input devices Input Devices, such as mice and keyboards, for interacting with user interfaces including login screens and other user interfaces for interacting with other computers connected to the network, for example, administration screens for administering identification and authorization profiles used by the techniques of the present invention.

Workstation computer system 10A also includes a hard disc controller HDC 14 that interfaces processor CPU to local storage device 17A and a network interface NWI that couples workstation computer system 10A to network 15, which may be fully wireless, fully wired or any type of hybrid network. Network interface NWI provides access to network resources, such as remote storage provided by networked storage devices 17B and 17C, which are coupled to network 15 by network disc controller (NWDC) 18. An external database DB may provide storage for documents, dictionaries, query results and other information discussed herein, alternatively document collection interfaces 11A and 11B may perform database organization, with the above-listed items stored as files in local storage device 17A or networked storage devices 17B and 17C. Workstation computer system 10B has an internal organization similar to that depicted in workstation computer system 10A and is also coupled to network 15.

Network 15 may include wireless local area networks (WLANs), wired local-area networks (LANs), wide-area networks (WANs) or any other suitable interconnection that provides communication between workstation computer systems 10A and 10B, storage devices 17A-17C, external database DB and any other systems and devices coupled to network 15. The present invention concerns document storage and retrieval functionality that is not limited to a specific computer system or network configuration. Finally, the specification workstation computer systems 10A and 10B and the location of their specific memory MEM and document collection interfaces 11A and 11B does not imply a specific client-server relationship or hierarchical organization, as the techniques of the present invention may be employed in distributed systems in which no particular machine is identified as a server. However, at least one of the machines provides an instance and functionality of an object or interface that performs document storage and retrieval in accordance with an embodiment of the present invention.

The objects or interfaces implementing document collection interfaces 11A and 11B process information according to methods and structures of the present invention, as described in further detail below.

Figure 2:
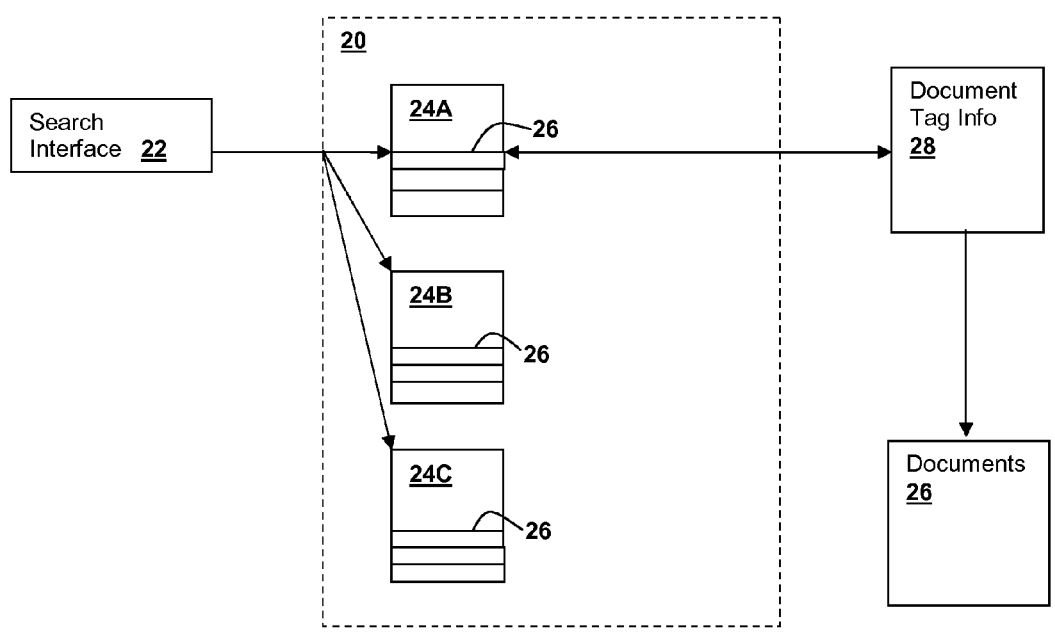
FIG. 2 is an organizational diagram showing an organization of a document tagging and retrieval system in accordance with an embodiment of the present invention.

Referring now to FIG. 2, an organization of a document tagging and retrieval system in accordance with an embodiment of the present invention is illustrated. A search interface 22, which may be a dedicated search interface, or a browser-based search portal as described above, provides access to a dictionary manager 20 that processes the terms in the queries supplied by search interface 22 in order to determine the subject of the query and other targeted information that will be used to retrieve one or more of documents 26. Per-subject dictionaries 24A-24C contain lists of terms and their corresponding SDP scores for the containing dictionary. Document tag information 28, which may be stored in documents 26, but is generally stored in a separate database or file for faster parsing of document tag information 28, is also accessed by dictionary manager 20 to discover documents having the closest match to the subject and particular search terms provided in a query from search interface 22. Dictionaries including SDPs can be created in different ways including: human-generated lists of terms with human-estimated SDPs, human-generated lists of terms with automatically calculated SDPs.

Referring now to FIG. 3, organization of dictionaries as may be used in the document tagging and retrieval system of FIG. 2, is shown. A first example dictionary 24A has a corresponding subject of Farm Supplies, and contains the terms FEED, FERTILIZER, IRRIGATION and PENS, with associated SDP scores given in an exemplary range of 1 through 10, of 6, 9, 7 and 2, respectively. Thus, discovery of the term FERTILIZER in the query indicates a high probability that the subject of the search corresponds to Farm Supplies, but the discovery of the term PENS in the query indicates only a low probability that the subject of the search corresponds to Farm Supplies. Another example dictionary 24B, having a corresponding subject of Office Supplies, contains the terms PENS, STAPLES, PAPER and FOLDERS, with associated SDP scores of 8, 6, 5, and 7, respectively. The pair of dictionaries 24A and 24B illustrates that a term, e.g., PENS, may be present in multiple dictionaries and have different SDP scores in each of the different per-subject dictionaries, in the exemplary case, illustrating that the term PEN is a much stronger indication that a search concerns Office Supplies than Farm Supplies.

Also illustrated in FIG. 3, are exemplary document tags that may be used to implement document tag information 28 as illustrated in FIG. 2. In exemplary document tag 28A, the tag information, which is just a single document tag that may be included in a header of a document, stored in a tag database, or otherwise organized in a tag store file, contains an optional document title and summary, a link to the actual document, and lists of terms by subject for each of multiple subjects that the document concerns. The title and summary information are optional, but may be included to provide a quick resource for displaying search results. The link to the document is not needed if the tag information is itself stored in the document header. Exemplary document tag 28B includes only subject names without terms, as dictionary manager 20 can use lists of subjects without specified lists of terms to perform matching within the set of dictionaries.

Figure 4:
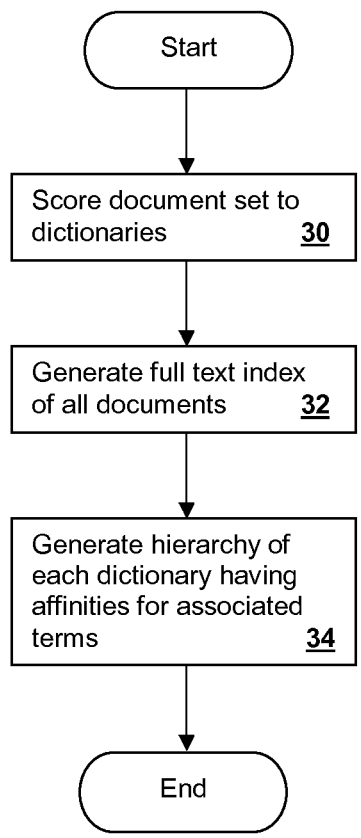
FIG. 4 is a flowchart illustrating a dictionary hierarchy information generation method in accordance with an embodiment of the present invention.

As pointed out above, the use of hierarchy information to enhance dictionary-assisted tagging and retrieval, exploits the existence of sub-classifications that may exist within the dictionary subjects. When a dictionary is created using a labeled data set, a hierarchy strategy can used to find sub-classifications that represent an organization more granular than that given by just the original labels in the data set. The techniques described herein may use clustering to group terms in sub-classifications when the terms are more strongly related to each other than to other terms. Referring to FIG. 4, a method for generating hierarchical dictionary information can be implemented by scoring a set of documents across a set of per-subject dictionaries (step 30), optionally generating a full-text index of all of the documents (step 32) and generating a hierarchy for each dictionary that has some affinity property for associated descriptive terms (step 34). The hierarchy information discovered during dictionary creation can be stored in a number of ways, i.e., an array, a table or a linked-list, but in general the information can be understood to map to a tree such as those shown in FIGS. 5A-5D. The tree can be the direct output of a hierarchical categorization algorithm.

Figure 5A:
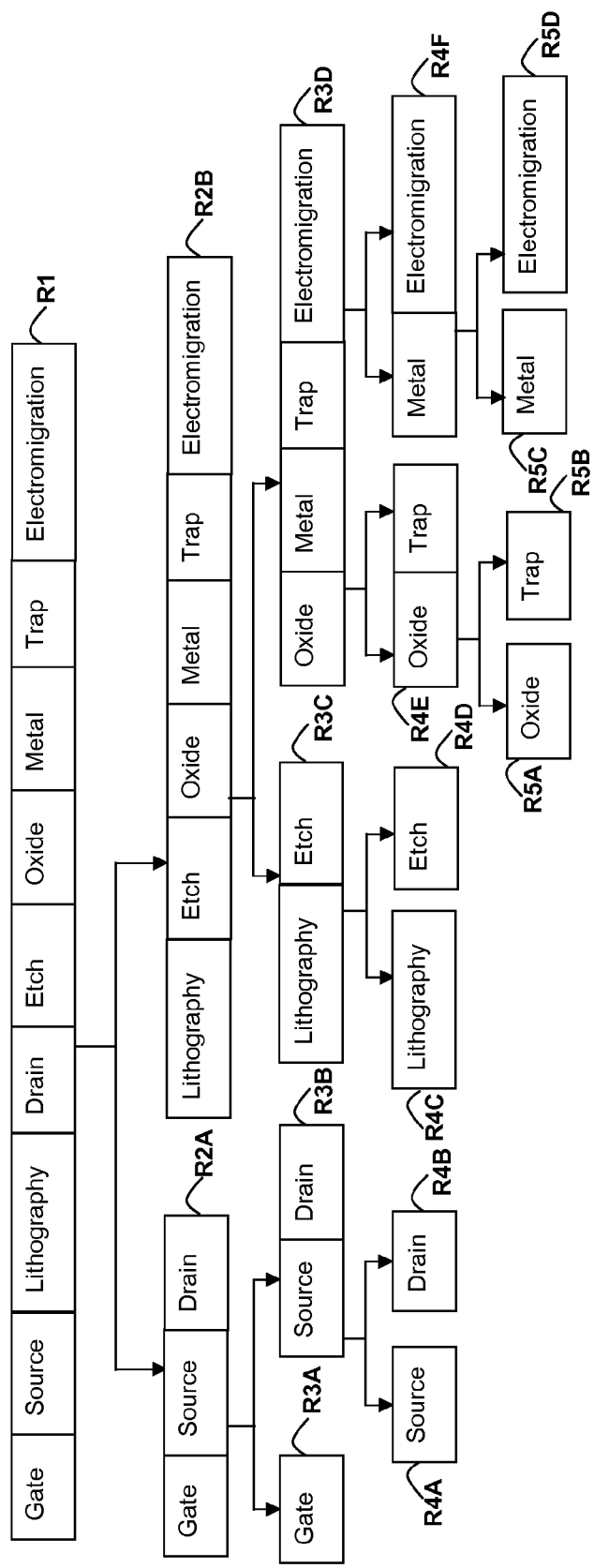
FIGS. 5A-5D are pictorial diagrams depicting organization of affinity groups as can be used in methods according to the present invention.

Referring now to FIG. 5A, an example hierarchical classification is shown. The top-level group in row R1 contains all of the terms in the dictionary. The second row is split into two sub-classified portions R2A and R2B. Each of sub-classified portions R2A and R2B is again bifurcated in the next row down. Sub-classification terminates when sub-classified portion has a single member. The hierarchical classification information may be generated using techniques such as hierarchical clustering. The distance metrics used to determine which terms belong in which clusters can be determined from co-occurrence of the terms across documents, with each bifurcation of the sub-classified groups minimizing the distance metric within the groups. Documents that match entries in a dictionary in the scoring in Step 30 of FIG. 4 are used to generate the hierarchy for each dictionary in Step 34. The criteria for a match between a document and a dictionary can be, for example, that a selected dictionary is the dictionary having the best match score for the document. Alternatively, the criteria may be, for example, that the match score between a document and the dictionary exceeds a threshold. In the latter example, the influence of a document on the hierarchy calculations can be weighted according to the match score. In the alternative example, the "transistor dictionary" exemplified in FIG. 5A may be augmented to store dictionary term locations in the classification hierarchy description as illustrated below in Table 1.

TABLE 1

| Subject = Transistor Dictionary | | |
|---|---|---|
| Term | SDP Score | Affinity Groups |
| Gate | 6 | R1, R2A, R3A |
| Source | 6 | R1, R2A, R3B, R4A |
| Drain | 6 | R1, R2A, R3B, R4B |
| Lithography | 5 | R1, R2B, R3C, R4C |
| Etch | 5 | R1, R2B, R3C, R4D |
| Electromigration | 7 | R1, R2B, R3D, R4F, R5D |
| Trap | 4 | R1, R2B, R3D, R4E, R5B |
| Metal | 3 | R1, R2B, R3D, R4F, R5C |
| Oxide | 4 | R1, R2B, R3D, R4E, R5A |

Figure 5B:
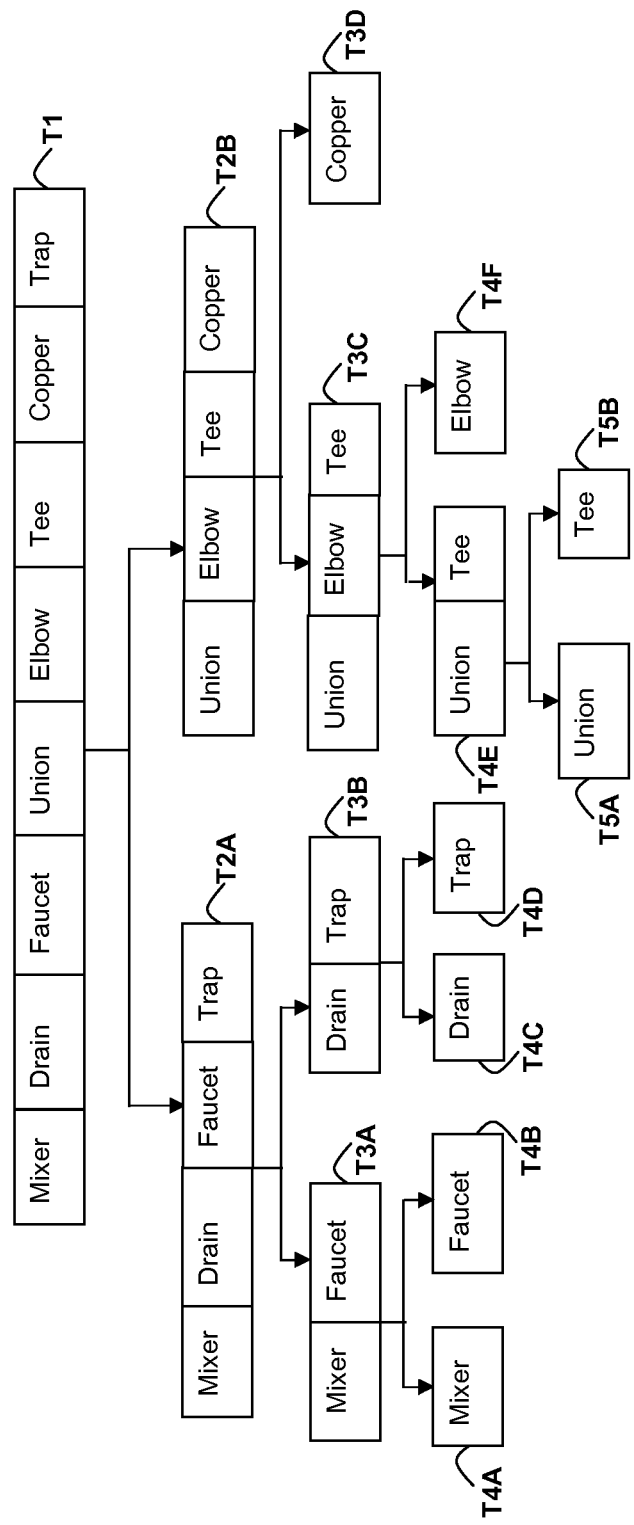

An additional example is given for a plumbing dictionary in Table 2, which is illustrated in graphical form in FIG. 5B.

TABLE 2

Subject = Plumbing Dictionary

| Term | SDP Score | Affinity Groups |
|---|---|---|
| Faucet | 7 | T1, T2A, T3A, T4B |
| Mixer | 3 | T1, T2A, T3A, T4A |
| Drain | 5 | T1, T2A, T3B, T4C |
| Trap | 2 | T1, T2A, T3B, T4D |
| Union | 2 | T1, T2B, T3C, T4E, T5A |
| Copper | 6 | T1, T2B, T3D |
| Tee | 4 | T1, T2B, T3C, T4E, T5B |
| Elbow | 4 | T1, T2B, T3C, T4F |

One exemplary application of the affinity information encoded in the hierarchy trees illustrated above is to weight the entry SDP scores obtained from the dictionaries according to the affinity group membership of the descriptive terms in the entries. In particular, the weighting can be applied when matching search terms to dictionaries to determine a subject for the search. Search terms with close affinity group membership increase the confidence that a dictionary matched to the search term(s) is a dictionary that has a subject with which the search terms are strongly related. The affinity information can be exploited by increasing the weight on SDPs during search-text to dictionary matching. For example, if the search terms are "drain" and "trap", the following procedure can be applied:

1. Calculate the maximum distance in the affinity tree needed to travel from the leaf node (a node containing only one term) that contains one of the search terms to a group containing both terms. For the example Transistor dictionary, the maximum distance is 4, from leaf node R5B to group R1. For the example Plumbing dictionary, the maximum distance for the same search terms is 1.
2. Determine the maximum distance as defined above between any two of the search terms in each affinity tree. For the example Transistor dictionary the result is 4. For the example Plumbing dictionary the result is also 4.
3. Calculate a weighting factor from the affinity values determined for each dictionary as 1+(max−x)/max, where x is the value calculated in step 1 above and max is the value calculated in step 2 above. For the example Transistor dictionary, the weighting factor is 1.0. For the example Plumbing dictionary, the weighting factor is 1.75.
4. Adjust the SDPs according to the weighting factors. In the example given above, the search-text match to the Transistor Dictionary is (6*0.5+4*0.5)*1=5. For the Plumbing dictionary the result is (5*0.5+2*0.5)*1.75=6.1.

Note that without the affinity-group enhancement the top match for the search-text would have been the Transistor dictionary, but with the affinity-group enhancement, the top-matching dictionary is the Plumbing dictionary. This change in ranking of the per-subject dictionaries is reflective of the principle that while words "drain" and "trap" are associated with both the Transistor and Plumbing subjects, when words "drain" and "trap" are used together they are more suggestive of the subject/classification Plumbing than the subject/classification Transistors.

Figure 5C:
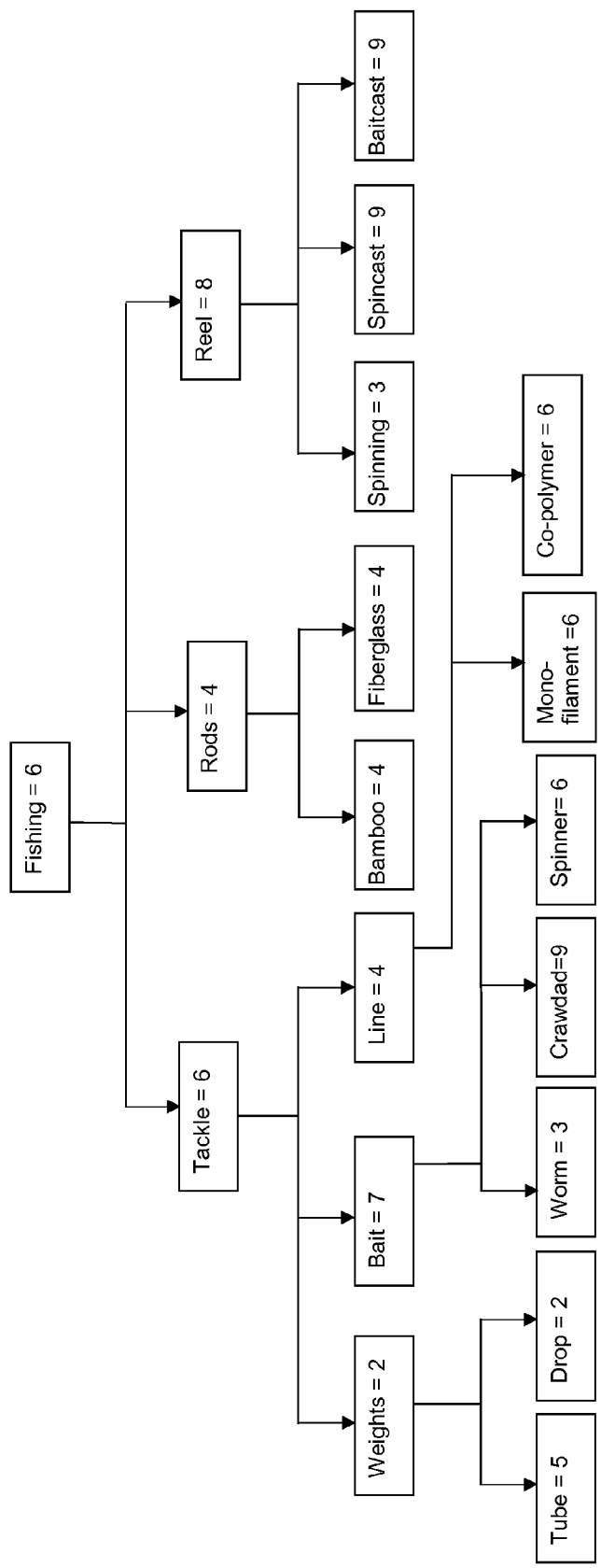
Figure 5D:
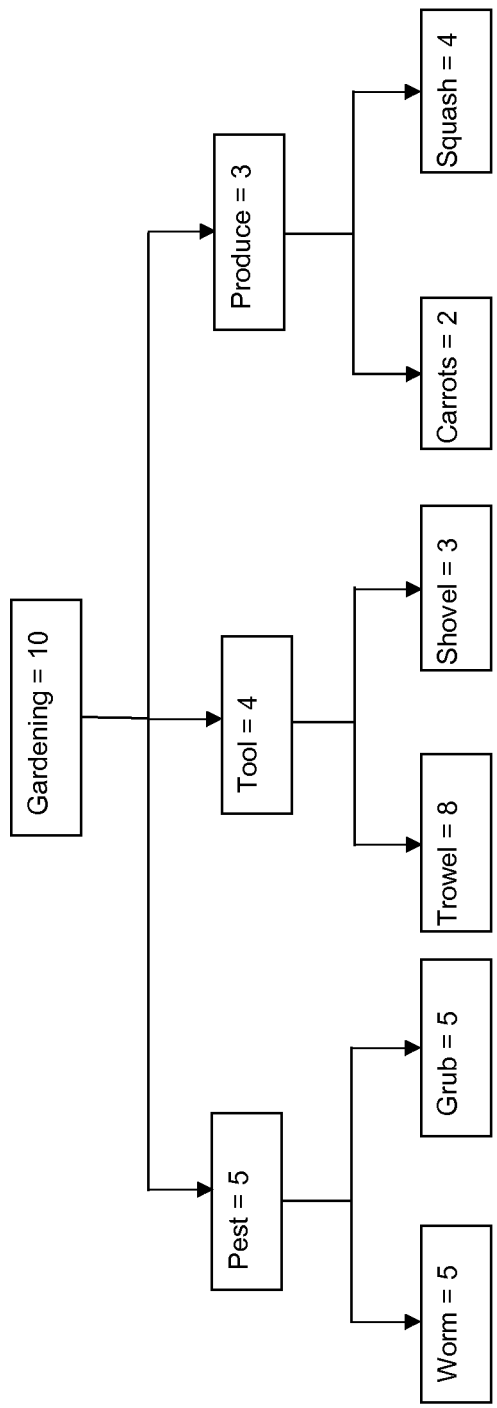

Referring now to FIG. 5C, another example of hierarchical classification in a dictionary is shown. In FIG. 5C, the hierarchy resembles an ontology. Terms are organized in a downward branching tree, in which each branch represents a different hierarchical sub-classification. Leaf nodes at the bottom of the tree have strong affinity to each other (siblings) and less affinity to nodes above the leaf nodes (parents) and even less affinity to leaf nodes under affinity to other leaf nodes not under the same parent (cousins). In the exemplary dictionary of FIG. 5C, terms Crawdad and Worm have a high affinity value with respect to each other, lower affinity values with respect to their parent term Bait, and still lower affinity values with respect to cousin terms Weights and Line. The full-text index of the documents generated in step 32 of FIG. 4 can also generate and store information describing the frequency of occurrence of terms in proximity to other terms, the average distance (in words) between pairs of terms in each document, or other indicators of affinity between the terms. The statistics of term proximities can be used to determine a distance between terms, which in turn may be used to determine which terms are grouped together at each level of the hierarchy. Terms that are adjacent most frequently, while not frequently appearing adjacent to other terms, can be collected to form groups or clusters, which then are placed in the lowest-level (bottom) row of the hierarchy. Terms that occur less frequently proximate the terms in a group, but occur equally frequently proximate the group and other groups, are placed at a next higher level in the hierarchy, and so forth. The classification process continues until the most generic term that is, on average, equally related to each of the highest sub-classifications is placed at the highest level of the hierarchy. The most generic term can be used as a descriptor of the subject of the dictionary. The steps taken to add hierarchy information to the dictionaries are described in further detail below. Step 30 of FIG. 4 can be performed by a method as described below with reference to FIG. 6, which describes tagging of documents, while in step 30 of FIG. 4 the documents are scored for best match with respect to the dictionaries.

Figure 6:
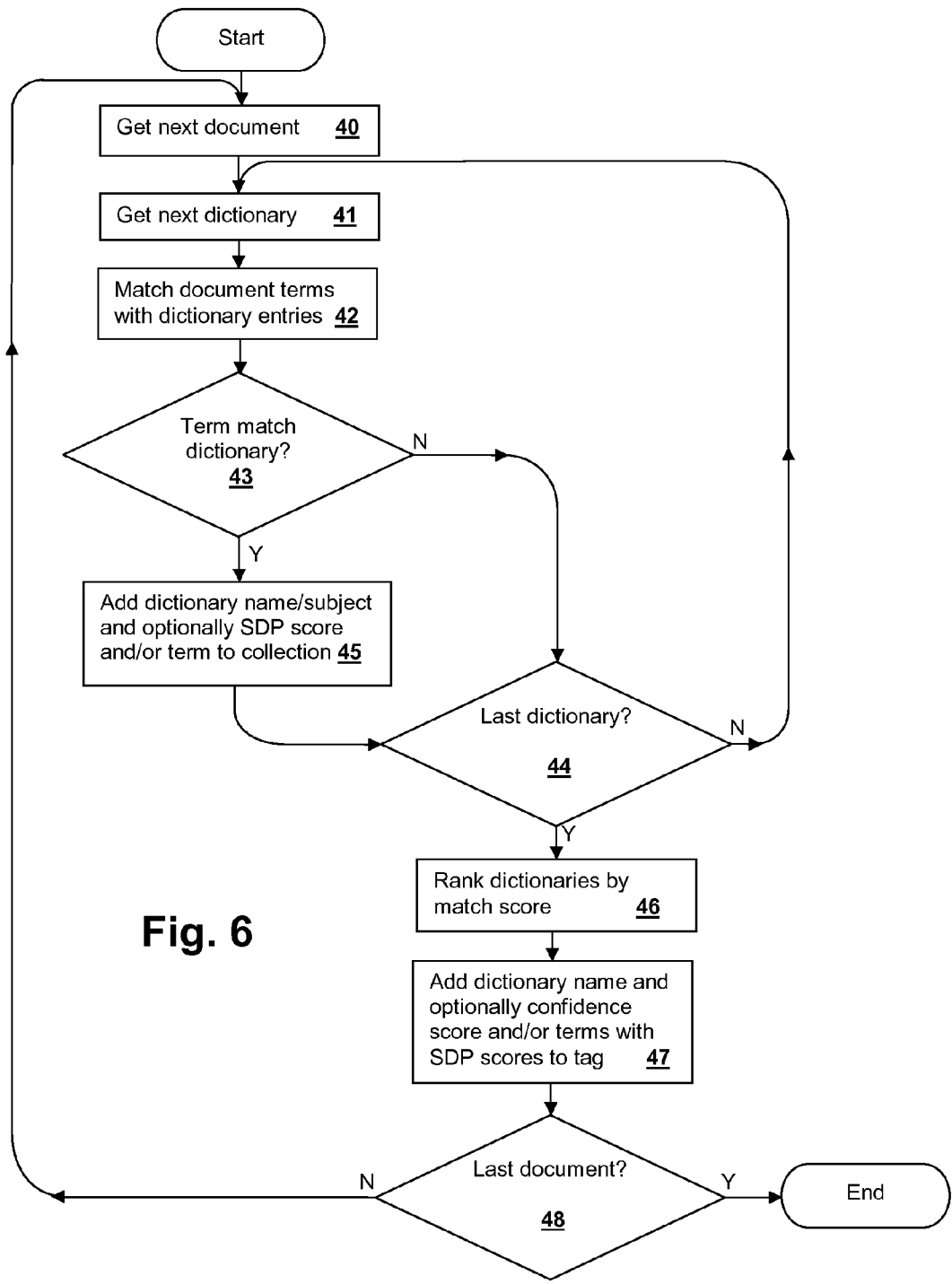
FIG. 6 is a flowchart illustrating a document tagging methodology in accordance with an embodiment of the present invention.

Referring now to FIG. 6, a method of tagging documents prior to processing search queries is shown in a flowchart. The method is used to associate document with classifications, i.e., the per-subject dictionaries, so that once a subject or subjects of a query is discovered, the appropriate documents can be retrieved. An initial/next document is retrieved (step 40) and an initial/next dictionary is accessed (step 41). The document terms are matched with the dictionary entries (step 42). If a term matches a term in one of the dictionaries (decision 43), then the dictionary name or subject (or other suitable identifier for the dictionary), and optionally the SDP score and/or term is added to the collection (step 45). Until the last dictionary is processed (decision 44) the next dictionary is accessed (step 41). After the last dictionary is processed (decision 44), the dictionaries are ranked by match score (step 46), and the dictionary name and optionally confidence score and/or terms with SDP scores are added to the document tag (step 47). Until the last document is processed (decision 48), the next document is retrieved and processed by the process of steps 40-48. In the example, the first step in tagging a document is matching the document against the set of dictionaries. The document can then be tagged with information such as: the names of the n top-matching dictionaries, a match score of the document against all dictionaries and optionally, the top m words from the n top-matching dictionaries. A dictionary match annotation in the tag may include a confidence score. If dictionary words are included in the tags, they can include the SDP of the word in the dictionary. The choice of information with which to tag depends on storage space and ease of use for retrieval of the document. Dictionary-matching may be performed by finding all terms that exist in both the document and a dictionary of interest, generating a document-occurrence vector with one entry per common term, generating a dictionary-vector with one entry per common term in the same order as the vector above, and multiplying the two vectors to get a dictionary-match score between the document and the dictionary. The vector multiplication sums the term-by-term products of the two vectors to produce a single number. The values of the dictionary-vector are the SDP scores. For a given document, the process can be repeated for all dictionaries. Once the dictionary-match step is completed, tags can be chosen for the document as described above. The tags selected provide a structure for storing and reporting the document-to-dictionary match results produced by step 30 of FIG. 4.

One manner in which the tagging information associated with a single document may be organized is to include the search terms in the tagging information along with the subject and SDP scores, such as illustrated in Table 3 below:

TABLE 3

| Confidence value | Subject of Dictionary | Term/SDP score pairs |
| --- | --- | --- |
| 0.5 | Bicycle | Bottom-Bracket 8, Schwinn 10, Raleigh 10, Frame 3 . . . |
| 0.3 | Home Construction | Brick 5, Frame 3.5, . . . |
| 0.1 | Fishing | Hook 7, Line 2 |

In the Example given above, once a candidate subject has selected, the terms having the top SDP scores (e.g., top 100 terms) may be inserted into the document tagging information in order to generalize the intersection between potential query terms and the document tag information. The end result is a set of documents scored to per-subject dictionaries. The next steps (steps 32 and 34 in FIG. 4) prepare the hierarchical information within (or stored alongside) the per-subject dictionaries. The full text index optionally prepared in step 32 keeps a record of each document and the counts of all occurrences of dictionary terms for each document. For example if document A contained the word tackle 20 times the full text index might contain the record {docA, tackle, 20}, which maps the term tackle and a number of its occurrence to document A. Table 4 below gives an example of a partial dictionary with SDPs for the subject "Fishing."

TABLE 4

| Fishing | |
| --- | --- |
| Term | SDP |
| Baitcase | 9 |
| Crawdad | 9 |
| Spincast | 9 |
| Reel | 8 |
| Bait | 7 |

Table 5 below is a list of documents with that match the fishing dictionary and some selected words in the document that lead to a match to the fishing dictionary.

TABLE 5

| Documents | Score | Selected terms in document that matched fishing dictionary |
| --- | --- | --- |
| docA | 100 | Tackle, bait, worm, line |
| docB | 90 | Crawdad, Spinner |
| docC | 60 | Spinner, weights, fiberglass |

Figure 7:
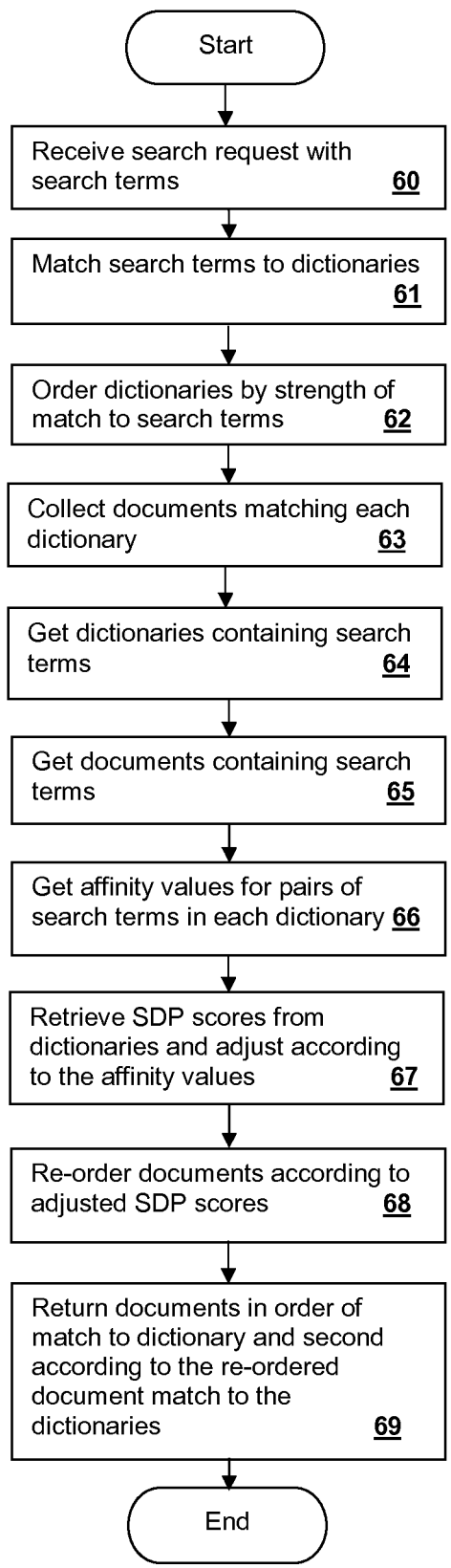
FIG. 7 is a flowchart illustrating a document retrieval methodology in accordance with an embodiment of the present invention.

Referring now to FIG. 7, a method of document retrieval in accordance with an embodiment of the invention is shown in a flowchart. A search request is received with search terms consisting of one or more words (step 60), and the dictionaries containing the search terms are matched (step 61). The dictionaries are ordered by strength of the match to the search terms (step 62). The affinity values are optionally used to adjust the SDP scores when matching the search terms to the dictionaries. For each matching dictionary, the documents matching the dictionaries are collected and ordered according to the pre-matched tag information that associates the dictionaries with the documents (step 63). The dictionaries containing the search terms are retrieved (step 64) as well as the documents containing the search terms (step 65). Affinity values are computed for pairs of the search terms in each dictionary (step 66). The SDP scores for the terms are retrieved from the dictionaries and adjusted according to the affinity values (step 67). The documents are re-ordered for each dictionary according to the adjusted SDP scores (step 68), and finally the documents are returned in order of the match, first between the search terms and the dictionary and second between the document and the dictionary using adjusted SDP scores (step 69).

Step 64 as described above locates the dictionaries containing the terms and step 65 locates the documents containing the query terms. For example if the query is "Crawdad, Spinner" the method would identify that the fishing dictionary and documents docB and docC contain the query terms as noted in Table 5. In step 66, the method identifies the affinity groups to which the query terms belong and calculates the distances between the terms, i.e., the affinity values. In the examples given herein, the distance function is defined by the number of nodes that traverse a path connecting two nodes in FIG. 5C and FIG. 5D, which correspond to terms. For example if a query specifies the terms "crawdad" and "spinner" the distance would be 1. In the example, the shortest distance is 1 not 0, indicating both terms are in the same affinity group, i.e., are connected beneath a single node at a single level of the classification hierarchy. Table 6 below gives a set of examples along with distance counts.

TABLE 6

| Query Terms | Path | Distance (Affinity) |
| --- | --- | --- |
| Worm, Bait | Worm → Bait | 2 |
| Worm, Line | Worm → Bait → Tackle→Line | 4 |
| Worm, Spincast | Worm→Bait→Tackle→Fishing→Reel→Spincast | 6 |

Alternatively, other methods can be used to compute the affinity values. One alternative method is to compute the difference in "height" in the tree between the terms. A term that is located in the same level of classification hierarchy is assigned a distance of 1, and any levels of classification that are traversed to reach the other term increment the distance for each such level traversed.

In the example, once the affinity values are obtained, in order to adjust the SDP scores, weighting factors are applied according to:

$w = \alpha/D$, where $D$ is the distance and $\alpha$ is a weighting factor and $SDP_{new} = SDP(1+w)$, where $SDP_{new}$ is the adjusted SDP score.

The above computations are performed for all matched search terms. For example if the search terms are "worm" and "bait", if $\alpha=1$ then the new SDP for worm is 3*(1+

$1*½)=4.5$ and Bait is $7*(1+1*½)=10.5$. When 3 or more query terms match in a dictionary a number of strategies can be employed. For example, if "crawdad", "worm" and "spincast" are query terms, since they are all present in the fishing dictionary, the strong affinity of "crawdad" and "worm" must be managed in view of the low affinity of "spincast." An average resulting SDP score may be computed, or the maximum or minimum SDP score might be used, depending on the needs of the system. For example, a new SDP score for each possible set of pairs of the terms "crawdad", "worm" and "spincast" can be computed according to the distance weighting equation above. Then, the average, maximum or minimum of the scores for each term may be used as the new (adjusted) SDP.

Step 68 in the method of FIG. 7 re-orders the document-to-dictionary match by using the adjusted SDPs to change the document scoring calculation. If hierarchy were not applied, documents would be returned in the order of the match between a raw score of the documents to the relevant dictionary, independent of the search terms. Referring to Table 7 below which lists documents that match the fishing dictionary of FIG. 5C and Table 8 below, which lists documents that match the gardening dictionary of FIG. 5D, a contrast between hierarchically-adjusted matching and non-adjusted matching will be demonstrated.

TABLE 7

| Documents | Score of document to fishing dictionary | Terms in document that match with initial SDP and percentage of occurrence in the document |
|---|---|---|
| docA | 2.3 | Tackle (6) (0.1), bait (7) (0.1), worm (3) (0.2), line (4) (0.1) |
| docB | 2.1 | Crawdad (9) (0.1), Spinner (6) (0.1), fiberglass (4) (0.1), weights (2) (0.1), |
| docC | 1.5 | Crawdad (9) (0.1), Spinner (6) (0.1) |
| docD | 0.3 | Worm (3) (0.1) |

TABLE 8

| Documents | Score of document to gardening dictionary | Terms in document that match gardening dictionary with initial SDP and percentage of occurrence in the document |
|---|---|---|
| docD | 1 | Worm (5)(0.1), grubs (5)(0.1) |
| docE | 1.2 | Squash (4)(0.1), Carrots 2 (0.4) |
| docF | 0.3 | Shovel (3)(0.1) |

Without hierarchical adjustment of the SDP scores in the search, search terms "Crawdad" and "Worm" would return the result:

Fishing <docA, docB, docC, docD>, Gardening<docE, docD, docF>

The Fishing dictionary appears first in the order because the Fishing dictionary is the best match to the search terms. Documents tagged with the Fishing dictionary are then ordered from highest-to-lowest match score against the Fishing dictionary. The Gardening dictionary appears next, and again the documents are ordered from highest-to-lowest match score against the gardening dictionary. In the non-hierarchical retrieval example, the order of the document within a given dictionary is independent of the search terms. Only the set of dictionaries and the order in which they are presented changes as the search terms change. For example, for search terms "worm" and "shovel" the results are:

Gardening<docE, docD, docF>, Fishing <docA, docB, docC, docD>

The order of the dictionaries differs from the results for "Crawdad" and "Worm" in the example above, but the order of the documents for the associated dictionaries is the same.

The hierarchical reordering of the per-dictionary results in step 68 of FIG. 7 modifies the order of the documents for the corresponding dictionaries to improve the result of the search. A newly calculated SDP score $SDP_{NEW}$ is computed from the original SDP score using the affinity values described above. For example, if the search terms are "Crawdad" and "Worm" the SDP scores for these terms in the dictionaries in which they appear will be increased according to the affinity between the terms "Crawdad" and "Worm" in the hierarchy of the particular dictionary. In the instant example, since only one term matches in the Gardening dictionary there will be no adjustment of match score for any document against the gardening dictionary. However, in the Fishing dictionary the search terms will be adjusted using the calculation shown above, yielding the following result (assuming $\alpha=1$):

Crawdad $SDP_{NEW}=18$

Worm $SDP_{NEW}=6$

For the subject of Fishing the scores of the documents can be calculated as follows:

$DOC_{score}=\text{sum}(SPD*\text{percent of occurrence})$ $docA=6*0.1+7*0.1+6*0.2+4*(0.1)=2.9$ $docB=18*0.1+6*0.1+4*0.1+2(0.1)=3.0$ $docC=18*0.1+6*0.1=2.4$ $docD=6*0.1=0.6$ Therefore, for search terms "Crawdad" and "Worm" using hierarchical retrieval the result would be:

Fishing <docB, docA, docC, docD>, Gardening<docE, docD, docF>

In the above result, documents docB and docA have changed order demonstrating the effect of hierarchical retrieval. The score for docD has changed only against the fishing dictionary, not the gardening dictionary, since the gardening dictionary does not contain both search terms and thus the SDP scores for the term Worm is not adjusted.

As noted above, portions of the present invention may be embodied in a computer program product, which may include firmware, an image in system memory or another memory/cache, or stored on a fixed or re-writable media such as an optical disc having computer-readable code stored thereon. Any combination of one or more computer-readable medium(s) may store a program in accordance with an embodiment of the invention. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of the present application, a computer-readable storage medium may be any tangible medium that can contain, or store a program for use by or in connection with an instruction execution system, apparatus, or device. A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including but not limited to wireless, wireline, optical fiber cable, RF, etc., or any suitable combination of the foregoing.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A computer-performed method of retrieving documents pertaining to one or more subjects from a collection of documents, the method comprising:
   specifying the one or more subjects;
   selecting one or more dictionaries from among multiple dictionaries according to the specified one or more subjects, wherein the multiple dictionaries have an associated unique subject, wherein entries in the multiple dictionaries contain descriptive terms, wherein at least some of the descriptive terms are present in two or more of the multiple dictionaries;
   matching, by the at least one processor, the one or more subjects to documents in the collection of documents to obtain a subset of the collection of documents that are relevant to the one or more subjects, wherein the matching generates document scores indicating the relative strength of a relationship between the specified subjects and the documents;
   within the computer system, maintaining records of hierarchy of classification for the entries within the multiple dictionaries for the multiple dictionaries, wherein the hierarchy records encode or store affinity values showing a strength of relationship between the entries within a corresponding dictionary;
   adjusting, by the at least one processor, the document scores using the records of hierarchy of classification for the specified one or more subjects; and
   returning, by the at least one processor, at least a portion of the subset of the collection of documents obtained by the matching.

2. The method of claim 1, wherein the entries have associated subject-determining power scores corresponding to the descriptive terms within the entries, wherein an individual subject-determining-power score indicates the relative strength or weakness of the corresponding descriptive term with respect to the subject associated with a particular dictionary containing the entry, and wherein the matching generates the document scores using the subject-determining power scores.

3. The method of claim 2, wherein the adjusting adjusts an order of the subset of documents returned by the matching according to the change in document scores.

4. The method of claim 2, wherein the adjusting is performed by multiplying the subject-determining power scores by a factor of $(1+\alpha/D)$, where a is a tuning parameter and D is a distance indicating a degree of decreasing affinity within the hierarchy of the corresponding dictionary.

5. The method of claim 1, further comprising computing, by the at least one processor, the affinity values according to a traversal distance between pairs of nodes of the tree structure corresponding to pairs of the terms or a difference in hierarchical levels of the terms within the tree structure.

6. The method of claim 1, wherein the maintaining a record of a hierarchy of classification of the entries maintains a tree structure having hierarchical levels corresponding to levels of classification, wherein a highest level of the hierarchy of classification is the subject associated with the dictionary and wherein the lowest level of the hierarchy of classification contains descriptive terms that do not describe a further sub-classification, with terms corresponding to sub-classifications of the subject disposed between the highest level of the hierarchy of classification and the lowest level of the hierarchy of classification.

7. A computer system comprising a processor for executing program instructions coupled to a memory for storing the program instructions, wherein the program instructions are program instructions for retrieving documents pertaining to one or more subjects from a collection of documents, and wherein the program instructions comprise:
   program instructions that specify the one or more subjects;
   program instructions that select one or more dictionaries from among multiple dictionaries according to the specified one or more subjects, wherein the multiple dictionaries have an associated unique subject, wherein entries in the multiple dictionaries contain descriptive terms, wherein at least some of the descriptive terms are present in two or more of the multiple dictionaries;
   program instructions that match the one or more subjects to documents in the collection of documents to obtain a subset of the collection of documents that are relevant to the one or more subjects and generate document scores indicating the relative strength of a relationship between the specified subjects and the documents;
   program instructions that maintain records of hierarchy of classification for the entries within the multiple dictionaries for the multiple dictionaries, wherein the hierarchy records encode or store affinity values showing a strength of relationship between the entries within a corresponding dictionary;
   program instructions that adjust a result of the matching using the records of hierarchy of classification for the specified one or more subjects; and
   program instructions that return at least a portion of the subset of the collection of documents obtained by the matching.

8. The computer system of claim 7, wherein the entries have associated subject-determining power scores corresponding to the descriptive terms within the entries, wherein an individual subject-determining-power score indicates the relative strength or weakness of the corresponding descriptive term with respect to the subject associated with a particular dictionary containing the entry, and wherein the program instructions that match generate the document scores using the subject-determining power scores.

9. The computer system of claim 8, wherein the program instructions that adjust change an order of the subset of documents returned by the program instructions that match according to the change in document scores.

10. The computer system of claim 8, wherein the program instructions for that adjust multiply the subject-determining power scores by a factor of $(1+\alpha/D)$, where a is a tuning parameter and D is a distance indicating a degree of decreasing affinity within the hierarchy of the corresponding dictionary.

11. The computer system of claim 7, further comprising program instructions that compute the affinity values according to a traversal distance between pairs of nodes of the tree structure corresponding to pairs of the terms or a difference in hierarchical levels of the terms within the tree structure.

12. The computer system of claim 7, wherein the program instructions for maintaining a record of a hierarchy of classification of the entries maintain a tree structure having hierarchical levels corresponding to levels of classification, wherein a highest level of the hierarchy of classification is the subject associated with the dictionary and wherein the lowest level of the hierarchy of classification contains descriptive terms that do not describe a further sub-classification, with terms corresponding to sub-classifications of the subject disposed between the highest level of the hierarchy of classification and the lowest level of the hierarchy of classification.

13. A computer program product comprising a computer-readable storage device storing program instructions for retrieving documents pertaining to one or more subjects from a collection of documents, wherein the program instructions comprise program instructions for:
   a collection of documents, the method comprising:
   specifying the one or more subjects;
   selecting one or more dictionaries from among multiple dictionaries according to the specified one or more subjects, wherein the multiple dictionaries have an associated unique subject, wherein entries in the multiple dictionaries contain descriptive terms, wherein at least some of the descriptive terms are present in two or more of the multiple dictionaries;
   matching, by the at least one processor, the one or more subjects to documents in the collection of documents to obtain a subset of the collection of documents that are relevant to the one or more subjects, wherein the matching generates document scores indicating the relative strength of a relationship between the specified subjects and the documents;
   within the computer system, maintaining records of hierarchy of classification for the entries within the multiple dictionaries for the multiple dictionaries, wherein the hierarchy records encode or store affinity values showing a strength of relationship between the entries within a corresponding dictionary;
   adjusting, by the at least one processor, the document scores using the records of hierarchy of classification for the specified one or more subjects; and
   returning, by the at least one processor, at least a portion of the subset of the collection of documents obtained by the matching.

14. The computer program product of claim 13, wherein the entries have associated subject-determining power scores corresponding to the descriptive terms within the entries, wherein an individual subject-determining-power score indicates the relative strength or weakness of the corresponding descriptive term with respect to the subject associated with a particular dictionary containing the entry, and wherein the program instructions for matching generate the document scores from the subject-determining power scores.

15. The computer program product of claim 14, wherein the program instructions for adjusting change an order of the subset of documents returned by the program instructions for second matching according to the change in document scores.

16. The computer program product of claim 14, wherein the program instructions for adjusting multiply the subject-determining power scores by a factor of $(1+\alpha/D)$, where a is a tuning parameter and D is a distance indicating a degree of decreasing affinity within the hierarchy of the corresponding dictionary.

17. The computer program product of claim 13, further comprising program instructions for computing the affinity values according to a traversal distance between pairs of nodes of the tree structure corresponding to pairs of the terms or a difference in hierarchical levels of the terms within the tree structure.

18. The computer program product of claim 13, wherein the program instructions for maintaining a record of a hierarchy of classification of the entries maintain a tree structure having hierarchical levels corresponding to levels of classification, wherein a highest level of the hierarchy of classification is the subject associated with the dictionary and wherein the lowest level of the hierarchy of classification contains descriptive terms that do not describe a further sub-classification, with terms corresponding to sub-classifications of the subject disposed between the highest level of the hierarchy of classification and the lowest level of the hierarchy of classification.

\* \* \* \* \*